(No Model.)

W. W. LEE.
LATHE CHUCK.

No. 277,908. Patented May 22, 1883.

WITNESSES:
C. B. Harford
E. G. Snow

INVENTOR:
William W. Lee

UNITED STATES PATENT OFFICE.

WILLIAM W. LEE, OF NORTHAMPTON, MASSACHUSETTS.

LATHE-CHUCK.

SPECIFICATION forming part of Letters Patent No. 277,908, dated May 22, 1883.

Application filed January 3, 1883. (No model.)

*To all whom it may concern:*

Be it known that I, WILLIAM W. LEE, of Northampton, in the county of Hampshire and State of Massachusetts, have invented certain new and useful Improvements in Chucks for Lathes, of which the following is a specification.

My invention relates to improvements in lathe-chucks; and it consists, mainly, in a bar carrying the jaws of the chuck and having a screw-threaded socket at its middle, by which it is screwed directly upon the lathe-spindle. Other features of my invention relate to the means for operating and adjusting the jaws, and to certain details of construction, all fully described below.

Figure 1:
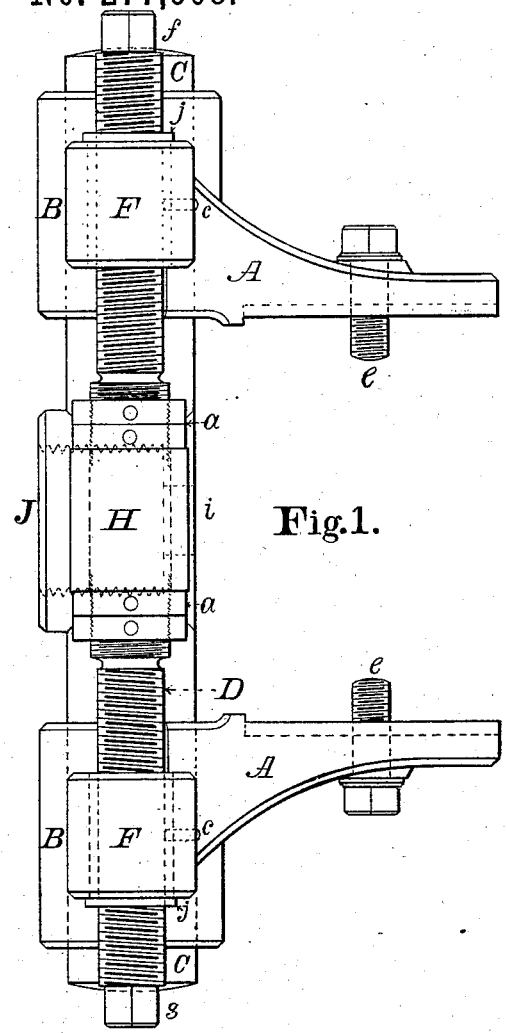
Figure 2:
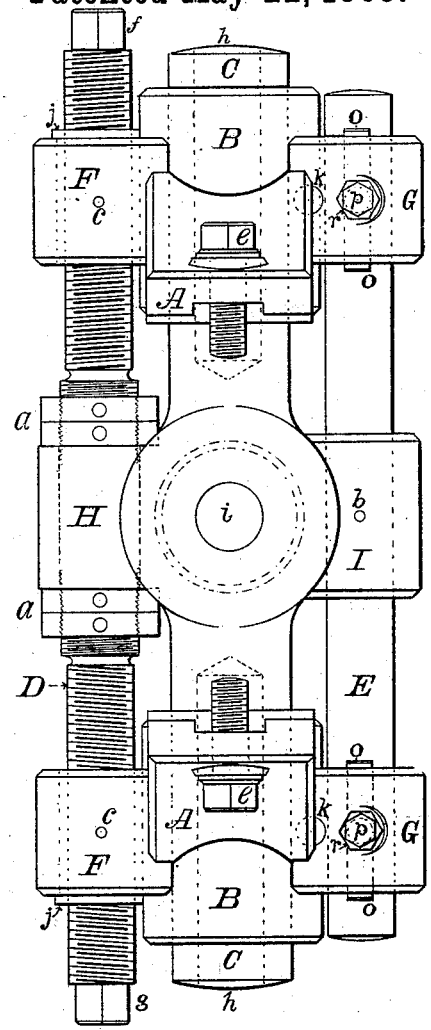
Figure 3:
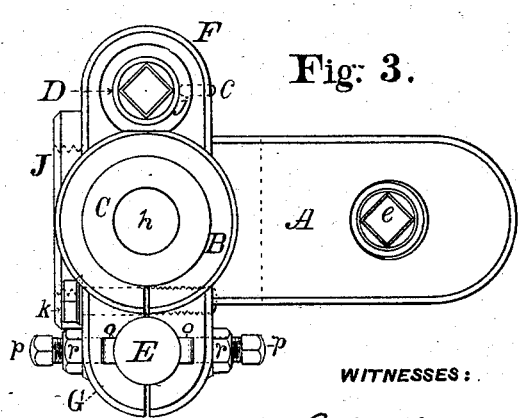

In the accompanying drawings, which illustrate a lathe-chuck with all my improvements as embodied in the best way now known to me, Figure 1 is a side elevation; Fig. 2, a front elevation, and Fig. 3 an end view.

My improved chuck consists of a bar, C C, having a screw-threaded socket, J, at its middle and carrying the jaws A A. The screw on the end of the lathe-spindle enters the socket J, and the chuck is thereby held firmly directly upon the spindle without the intervention of the hub or disk usually used with other chucks. Proper means must of course be used for causing the jaws to act as clamps; and the other features of my invention relate mainly to such means.

The jaws A may evidently be connected with the bar C, so as to slide thereon in various ways without departing from my invention; but I prefer the arrangement shown in the drawings, as it is the strongest and best. Each jaw A has a hole through its base B, made to fit the bar C. Lugs F and G are fast to the bases B B of the jaws A A, and also have holes through them. The holes through the lugs F receive the screw-threaded rod D, and the lugs G are made to fit the rod E. The jaws are actuated by the rod D, which passes through the holes in the lugs F, which are provided with interior bushings, *j*, accurately fitted and secured by the pins *c*. These bushings *j* are threaded, one right and the other left handed, to receive the threads on the rod D, and are readily removed when worn. This rod D passes through and turns in a sleeve, H, secured to the bar C, and is accurately adjusted and held in place by means of the nuts *a*, which bear against the ends of the sleeve H, and are held in position by lock-nuts. The holes in the lugs G encircle rod E, which is secured to the bar C by means of a sleeve, I, and pin *b*. A slit is made through one side of each lug G and into hole B. (See Fig. 3.) By means of this slit and the screw-bolt *k* the jaw can be at any time accurately adjusted upon the bar C. Gibs *o*, adjusted by means of the screws *p*, which are retained in position by the set-nuts *r*, are provided to maintain a proper fit between holes in the lugs G and the rod E. Extra jaws adapted to clutch certain articles to be turned may be secured to the jaws A by means of the screw-bolts *e*. The side rod, E, which serves to steady the jaws, is more especially adapted for high speeds, and is therefore properly proportioned to counterbalance the right and left threaded rod D. The chuck is secured to the spindle by means of the screw-threaded socket J, which is also provided with an opening, *i*, by means of which and a hollow spindle a rod of considerable length may be worked in the lathe. The ends *f* and *g* of the rod D are properly shaped to receive a wrench or the like for turning the rod. The bar C is made as light as possible by being hollowed at the ends *h*.

In operation, for round turning, the jaws are accurately adjusted equidistant from the axis of the socket J by means of the nuts *a* on the middle part of the right and left threaded rod D. The article to be turned is secured and centered by being clamped between the jaws A. The article is released by turning rod D in a direction to cause the jaws to recede from each other.

By changing the positions of the nuts *a a* the jaws can be set in any desired relation to the axis of the lathe-spindle, so as to adapt the chuck for either round or eccentric turning. The nuts next to the sleeve H are adjusted so as not to bear hard against the sleeve, but just enough to prevent the screw-threaded rod D from moving endwise. The lock-nuts are then screwed up hard against these nuts, thereby preventing them from turning and binding against the sleeve H. Instead of lock-nuts, set-screws may be inserted in the nuts next to the sleeve.

I claim as my invention—

1. The combination of jaws A A, and means, substantially such as is described, for operating them, with bar C, having a threaded socket, J, adapted to receive the screw end of the lathe-spindle, substantially as described.

2. In a lathe-chuck, the combination of bar C, jaws A A, guided by and moving on the bar C, rod D, provided with right and left threads and screwing into nuts secured to the jaws, sleeve H, secured to bar C and through which rod D passes, and means, such as described, for adjusting the rod D in relation to the sleeve H, substantially as described.

3. In combination, bar C, jaws A A, sliding thereon, right and left threaded rod D, and rod E, serving both to steady the jaws and counterbalance the screw-threaded rod, substantially as set forth.

4. The right and left screw-threaded rod D, having the intermediate screw-threads for the nuts $a$, in combination with sleeve H, carried by the bar C, and nuts $a$, by means of which the rod may be adjusted, substantially as set forth.

5. In combination, the bar C, rod D, jaws A A, provided with lugs G G, rod E, passing through the lugs G G and secured to the bar C, gibs $o$, and set-screws $p$, substantially as and for the purposes set forth.

6. In a lathe-chuck, the bar C, provided with a screw-threaded socket, J, by means of which it may be secured directly to the lathe-spindle, as set forth.

WILLIAM W. LEE.

Witnesses:
W. A. COPELAND,
G. B. MAYNADIER.